United States Patent [19]

Kwon et al.

[11] Patent Number: 5,742,360
[45] Date of Patent: Apr. 21, 1998

[54] DISPLAY APPARATUS USING AN INTERMEDIATE REINFORCING FRAME

[75] Inventors: Sung Su Kwon, Seoul; Jae Soo Sim; Young Tai Kim, both of Suwon, all of Rep. of Korea

[73] Assignee: Samsung Electronics, Ltd., Suwon, Rep. of Korea

[21] Appl. No.: 766,533

[22] Filed: Dec. 11, 1996

Related U.S. Application Data

[63] Continuation of Ser. No. 451,418, May 26, 1995.

[30] Foreign Application Priority Data

May 30, 1994 [KR] Rep. of Korea ............ 94-12086
May 30, 1994 [KR] Rep. of Korea ............ 94-12087

[51] Int. Cl.$^6$ ............ H04N 5/64; H04N 5/645; H04N 5/65; H01J 31/00
[52] U.S. Cl. ............ 348/839; 348/826; 348/824; 348/818; 348/825; 348/836; 313/482; 220/4.26; 220/325; 220/327; 312/7.2; 312/223.1; 312/223.2
[58] Field of Search ............ 348/839, 826, 348/824, 821, 818, 823, 825, 794, 787, 790, 836; 313/477 R, 478, 479, 482; 220/4.26, 4.33, 4.02, 616, 325, 327; 345/87, 173; 312/223.1, 223.2, 7.2

[56] References Cited

U.S. PATENT DOCUMENTS

| | | | |
|---|---|---|---|
| 2,896,200 | 7/1959 | Aeschliman | 348/825 |
| 2,896,201 | 7/1959 | Ackerman | 348/831 |
| 3,087,013 | 4/1963 | Stastny et al. | 348/825 |
| 3,294,905 | 12/1966 | Jonassen | 348/823 |
| 3,317,172 | 5/1967 | Balint | 348/822 |
| 3,845,530 | 11/1974 | Platt | 29/25.13 |
| 3,952,152 | 4/1976 | Lill et al. | 178/7.82 |
| 4,017,129 | 4/1977 | Boldt et al. | 312/7 |
| 4,063,289 | 12/1977 | Veenendaal | 358/242 |
| 4,485,329 | 11/1984 | Donofrio et al. | 313/478 |
| 4,820,224 | 4/1989 | Lemche | 445/23 |
| 4,898,555 | 2/1990 | Sampson | 445/22 |
| 5,084,757 | 1/1992 | Leo et al. | 358/248 |
| 5,299,016 | 3/1994 | Hirota et al. | 348/818 |

*Primary Examiner*—Edward L. Coles, Sr.
*Assistant Examiner*—Tia M. Harris
*Attorney, Agent, or Firm*—Banner & Witcoff, Ltd.

[57] ABSTRACT

A monitor case assembly includes a front case section to which a cathode ray tube is fixed; a rear case section fastened to the front case section; and an intermediate case section interposed between the front and rear sections for reenforcing the case and preventing distortion in the case due to the weight of the cathode ray tube. The monitor case assembly also providing a more visually appealing exterior appearance.

18 Claims, 7 Drawing Sheets

DISPLAY APPARATUS USING AN INTERMEDIATE REINFORCING FRAME

This application is a continuation of application Ser. No. 08/451,418, filed May 26, 1995.

BACKGROUND OF THE INVENTION

The present invention relates to a monitor assembly, and more particularly, to a monitor assembly apparatus for assembling a front case section, cathode ray tube, and rear case section of a monitor, using an intermediate reinforcing frame interposed between the front and rear sections.

Generally, a monitor assembly can be roughly divided into a cathode ray tube, front and rear case sections, and a stand for adjusting a screen to a proper viewing position. The assembly means for the monitor components is well known in the art.

FIGS. 1 and 2 illustrate an example of the prior art in which primed reference numerals are used. Referring to FIG. 1, in a cathode ray tube 10', lugs 12' are fixed to first fastening portions 15a' of a front case section 15' by screws 14'. A rear case section 16' is secured to second fastening portions 15b' of front case section 15' by screws 17' passing through a coupling hole 16a'.

In the prior art, the assembly of the monitor components varies slightly from manufacturer to manufacturer. However, the assembly mechanism in which cathode ray tube 10' is directly fixed to front section 15' and rear section 16' is directly fixed to front section 15' is achieved using virtually the method described above.

The conventional monitor is assembled in such a manner that the front section bears the heavy weight of a cathode ray tube directly. However, the front section must have a large opening 15c' through which the cathode ray tube can be viewed. For this reason, the front section lacks the structural integrity to stably support the cathode ray tube, and may result in sagging or distortion of the case. Such sagging or distortion creates a gap between the front and rear sections so that foreign matter, e.g., dust, can infiltrate the monitor, which may interfere with the monitor's performance. As a result, these problems decrease product reliability. Further, such a gap detracts from the appearance of the exterior of the monitor.

In the conventional monitor, only screws are used for assembly, and thus many screws must be individually fastened thereby making the assembly process time consuming and inefficient. In addition, the fastening portions in which the screws are received becomes worn. Therefore, once the monitor is assembled and disassembled a few times, the fastening force of the screws is weakened, so that attachment of the front and rear sections is loosened.

As explained above, the conventional assembly means for a monitor decreases product reliability. Further, since the rear section is directly fixed to the front section their colors should match because different or clashing colors would be unsightly. For this reason, there is a tendency toward the manufacture of single-colored monitors resulting in an aesthetic monotony.

SUMMARY OF THE INVENTION

Therefore, it is an object of the present invention to provide a monitor assembly apparatus in which the weight of a cathode ray tube is more evenly distributed to prevent sagging and gapping between front and rear sections.

It is another object of the present invention to provide a monitor assembly apparatus in which the number of screw fastening elements is reduced to simplify the assembly process and increase efficiency.

It is still another object of the present invention to provide a monitor assembly apparatus which prevents the coupling portion of the front section from becoming worn due to repeated assembly and disassembly of the screw fastening means.

It is yet another object of the present invention to provide a monitor assembly apparatus which allows for a variety of colors to enhance aesthetic appeal.

To accomplish the above objects of the present invention, there is provided an intermediate reinforcing frame assembled between the front and rear sections. Assembly means is provided in the intermediate frame for fixing the cathode ray tube to the front section. The front section is securely supported by the intermediate frame. The upper portion of the rear section is assembled to the intermediate frame without the use of screws.

The present invention is characterized in providing a case assembly for housing a cathode ray tube, comprised of front and rear sections and an intermediate frame therebetween, which eliminates sagging and reinforces its strength. In addition, the present invention includes means for easily coupling the rear section on the rear side of the intermediate frame. Further, for aesthetics, the present invention is characterized in varying the colors and/or textures of the intermediate frame from the front and rear sections.

These and other features and advantages of the invention may be more completely understood from the following detailed description of the preferred embodiment of the invention with reference to the accompanying drawings.

DETAILED DESCRIPTION OF THE PREFERRED EMBODIMENTS

Figure 1:
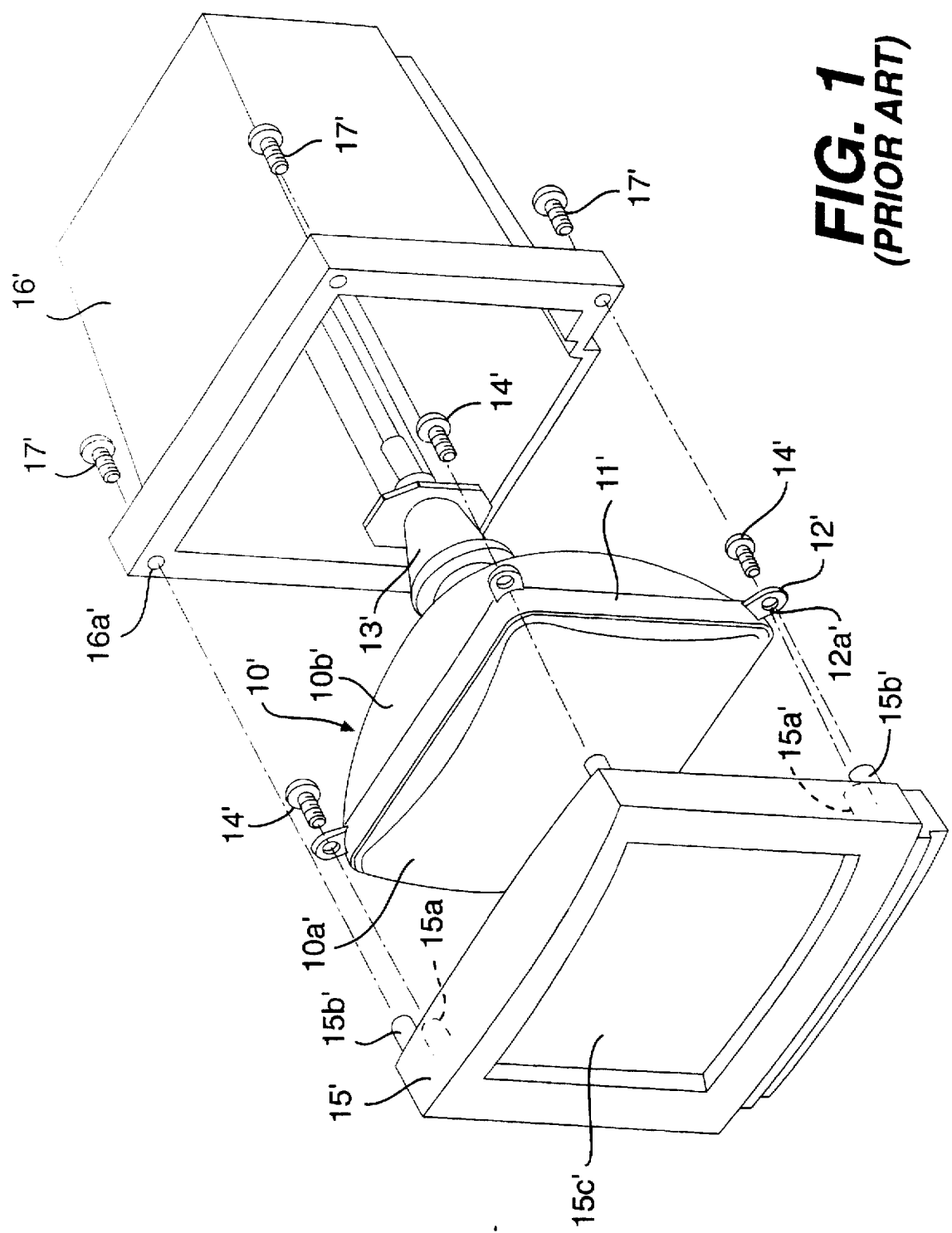
FIG. 1 is an exploded perspective view of a conventional monitor case assembly.
Figure 2:
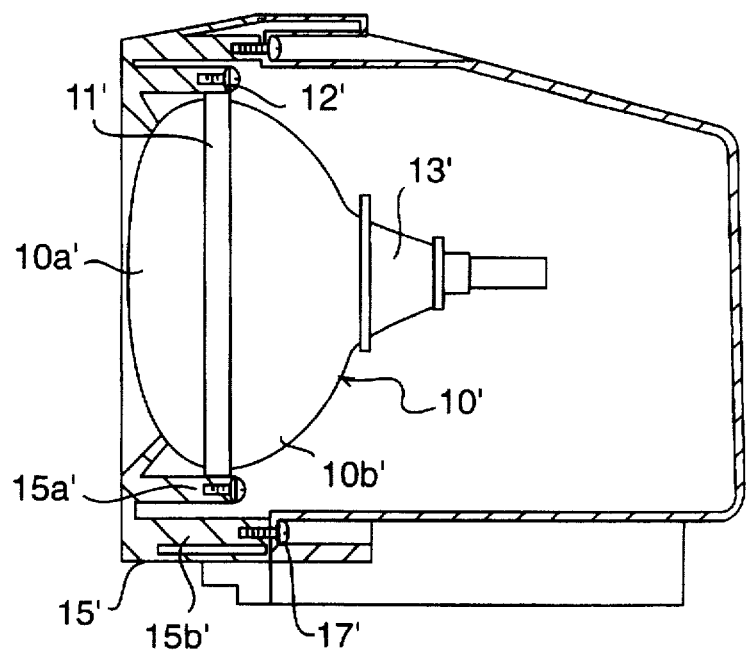
FIG. 2 is a cross-sectional view of the conventional monitor case assembly of FIG. 1 shown assembled.
Figure 3:
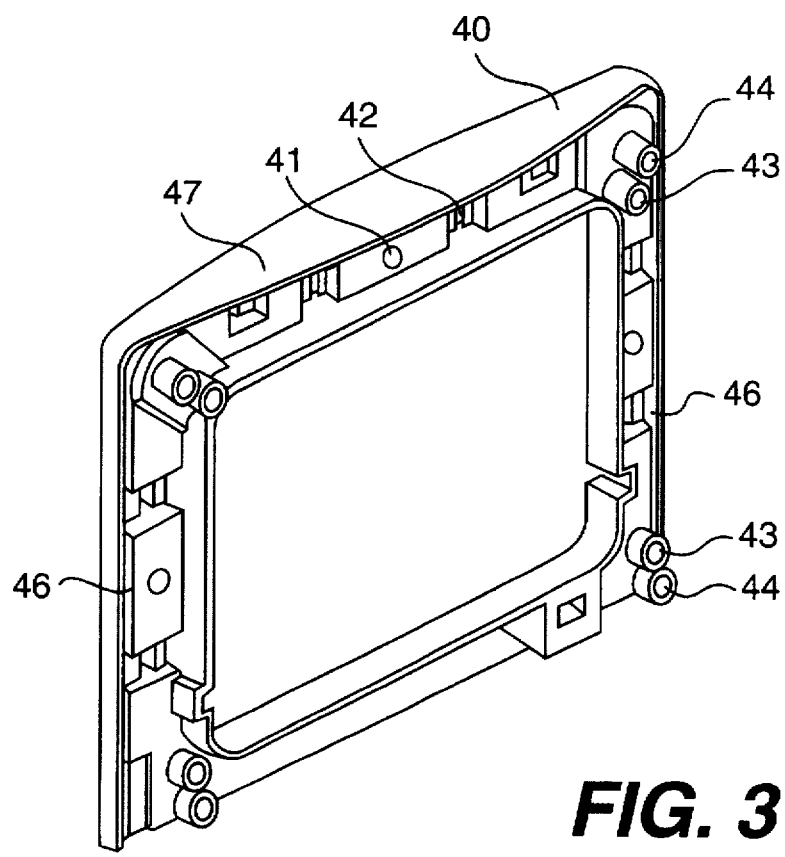
FIG. 3 is a rear perspective view of an intermediate frame of a monitor case assembly in accordance with the present invention.
Figure 4:
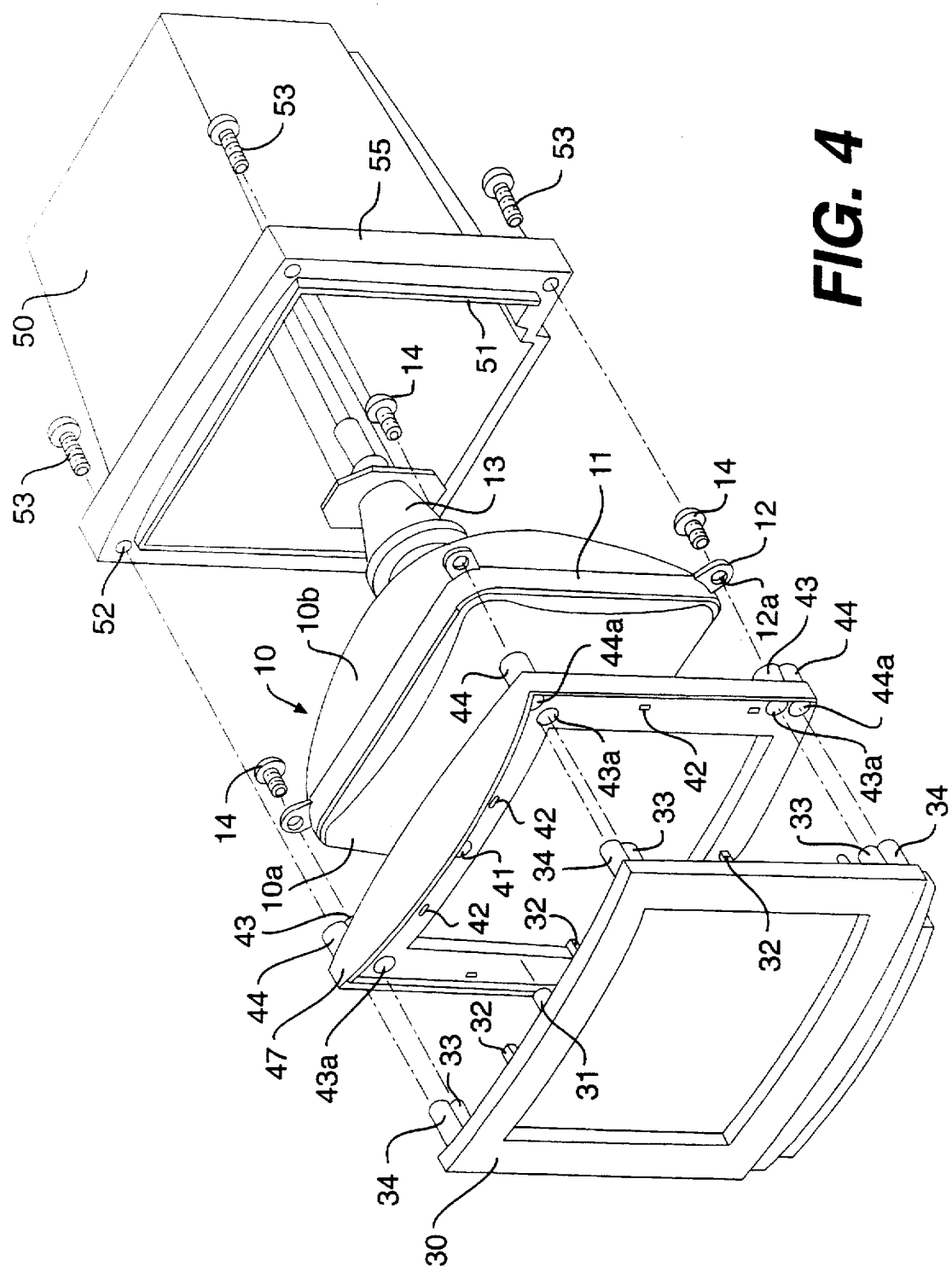
FIG. 4 is an exploded perspective view of a first preferred embodiment of the monitor case assembly of the present invention.
Figure 10:
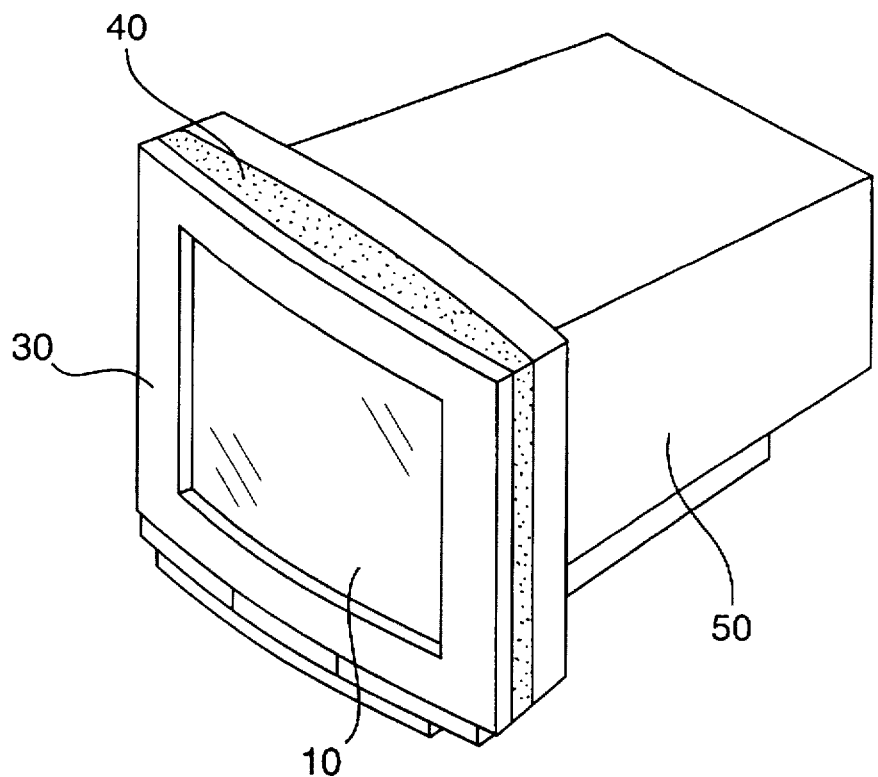
FIG. 10 is a perspective view of an assembled monitor case assembly of the present invention.

FIGS. 3–6 illustrate a first preferred embodiment of the present invention. Referring to FIGS. 3 and 4, a band 11 is provided around the periphery of a cathode ray tube (CRT) 10, the CRT composed of a panel 10a and funnel 10b. At each of the four corners of band 11, a lug 12 is provided, each of which has a screw hole 12a for fixing cathode ray tube 10. Lugs 12 are attached to band 11 by any known method, such as, for instance, by welding. A deflection yoke 13 for deflecting an electron beam projected from an electron gun is mounted on the rear portion of CRT 10. The monitor case assembly of the present invention broadly comprises a front case section 30, an intermediate reinforcing frame section 40 and a rear case section 50 assembled together as shown in FIG. 10. The intermediate frame serves to strengthen the overall support structure for the CRT. In addition the present invention comprises a first assembly means for assembling the front section and intermediate frame to the cathode ray tube; and a second assembly means for assembling the external monitor case, namely the front section, intermediate frame and the rear section.

The monitor case assembly comprises a front case section 30 having an opening through which CRT 10 is visible. A fixing protrusion 31 is protrudently formed on the rear side of front section 30 generally centered on its top edge. Tabs 32 are preferably provided on either side of fixing protrusion 31. More tabs 32 of substantially the same shape are further provided along the rear surface of both side walls of the front section 30. Additionally provided on the rear side of front section 30, in each corner are first fastening elements or protrusions 33 and second fastening elements or protrusions 34. In the two top corners, each second fastening element 34 is preferably located diagonally outward from the first fastening element 33 in its respective corner. In the two bottom corners, each second fastening element 34 is preferably located below the first fastening element 33 in its respective corner. Fastening elements 33 and 34 have threaded openings for receiving screws.

A substantially rectangular intermediate reinforcing frame 40, is configured to be attached to front section 30 and has a fixing hole 41 disposed to engage fixing protrusion 31 of front section 30. Top surface 47 of intermediate frame 40 preferably has overhanging curved edges which generally follow the curve of front Section 30, and cover fixing protrusion 31 and fastening elements 33, 34 of front section 30 when assembled thereto. Intermediate frame also has slots 42 which are formed therein and located to engage tabs 32. The four corners of intermediate frame 40, are provided with first bosses 43 having insertion hole 43a, and second bosses 44 having insertion holes 44a. Bosses 43 and 44 are preferably formed to protrude from the rear surface of intermediate frame 40. First bosses 43 are located so that insertion holes 43a align with respective first fastening elements 33 of front section 30, and second bosses 44 are located so that insertion holes 44a align with respective second fastening elements 34 of front section 30. First bosses 43 receive first fastening elements 33 and second bosses 44 receive second fastening elements 34 of front section 30. Cathode ray tube 10 is thus secured to first fastening elements 33, and rear case section 50 is secured to second fastening elements 34.

Rear case section 50 is fixed to second fastening elements 34 by screws 53. A guide protrusion 51 is configured to be press-fitted into a guide groove 46 of intermediate frame 40. Rear section 50 resembles an open box with the open end receiving the CRT. The opening is surrounded by an integral frame member 55 having assembly holes 52 in the corners.

Figure 5:
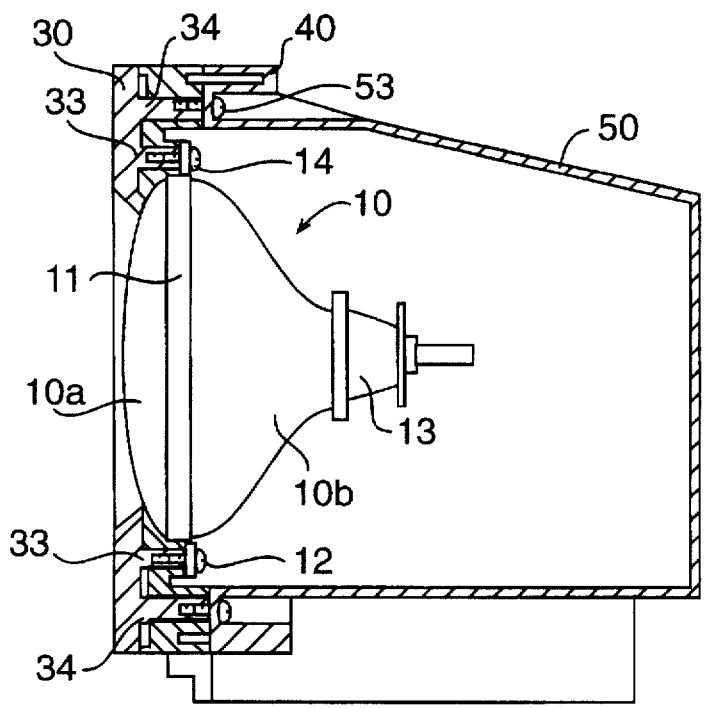
FIG. 5 is a cross-sectional view of the monitor case assembly of FIG. 4, shown assembled.
Figure 6:
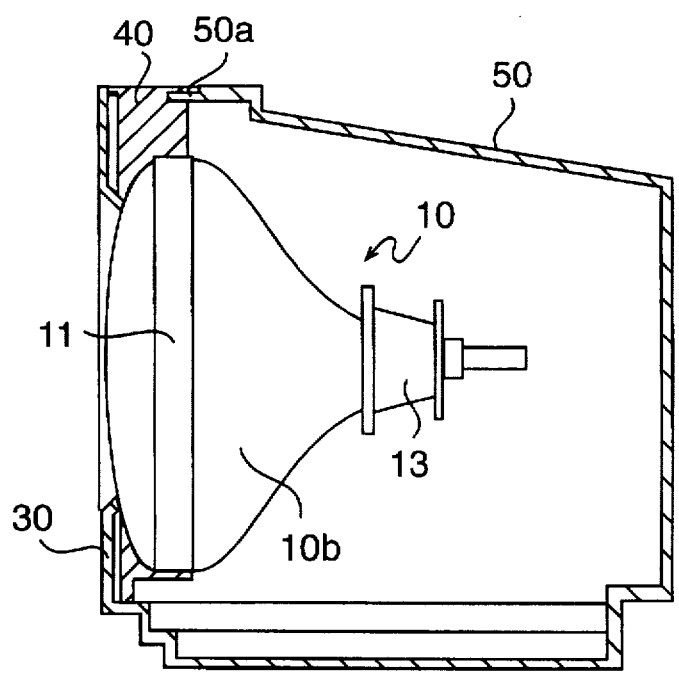
FIG. 6 is a cross-sectional view of the monitor case assembly of FIG. 4 shown partially assembled.

The assembly process of the monitor case constructed as above will be explained below with reference to FIGS. 4–6.

First, front section 30 and intermediate frame 40 are attached to each other. Specifically, first fastening elements 33 are fitted into first bosses 43 of intermediate frame 40, and second fixing elements 34 are fitted into second bosses 44. Fixing protrusion 31 and tabs 32 are fitted into fixing hole 41 and slots 42, respectively. Front section 30 is thus coupled to intermediate frame 40. Thereafter, CRT 10 is secured to first fastening elements 33 of front section 30 by four fastening screws 14 through lugs 12 of band 11. The assembly of the front case, intermediate frame and CRT via engagement of first fastening elements 33 to first bosses 43; fixing protrusion 31 to fixing hole 41; tabs 32 to slots 42; and alignment of lugs 12 and attaching by screws 14 is generally referred to as the first assembly means. Any subcombination of the above-described elements may comprise the first assembly means, as well as other known coupling devices.

Front section 30, intermediate frame 40 and rear section 50 are assembled by a second assembly means. The second assembly means includes second fastening elements 34 inserted into insertion holes 44a of second bosses 44. In addition, in the second assembly means, assembly holes 52 of rear section 50 are lined up with second fastening elements 34 of front section 30 and second bosses 44 of intermediate section 40, and guide protrusion 51 of rear section 50 is then press-fitted into the guide groove 46 of intermediate frame 40, and screws 53 are used to connect the front section, intermediate frame and rear section together at the corners, and tightened as necessary. Second assembly means may comprise any sub-combination of the above-described elements, as well as other known coupling devices.

The intermediate frame is thus interposed between the front and rear sections, and serves to re-enforce the strength of the monitor case assembly. In addition, a variety of colors can be used for the intermediate frame, making the exterior of the monitor case visually appealing.

Figure 7:
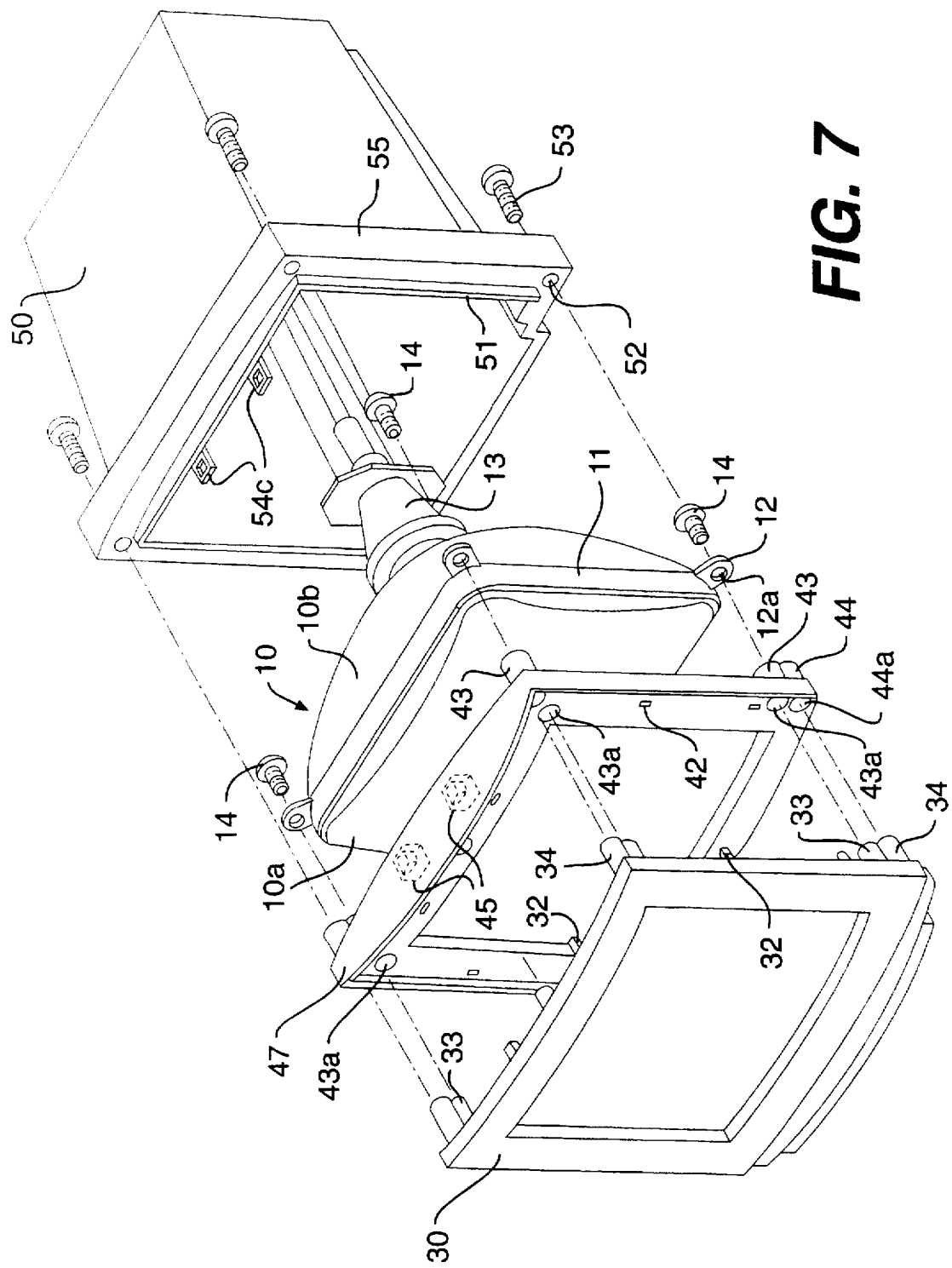
FIG. 7 is an exploded perspective view of a second preferred embodiment of the monitor case assembly of the present invention.
Figure 8:
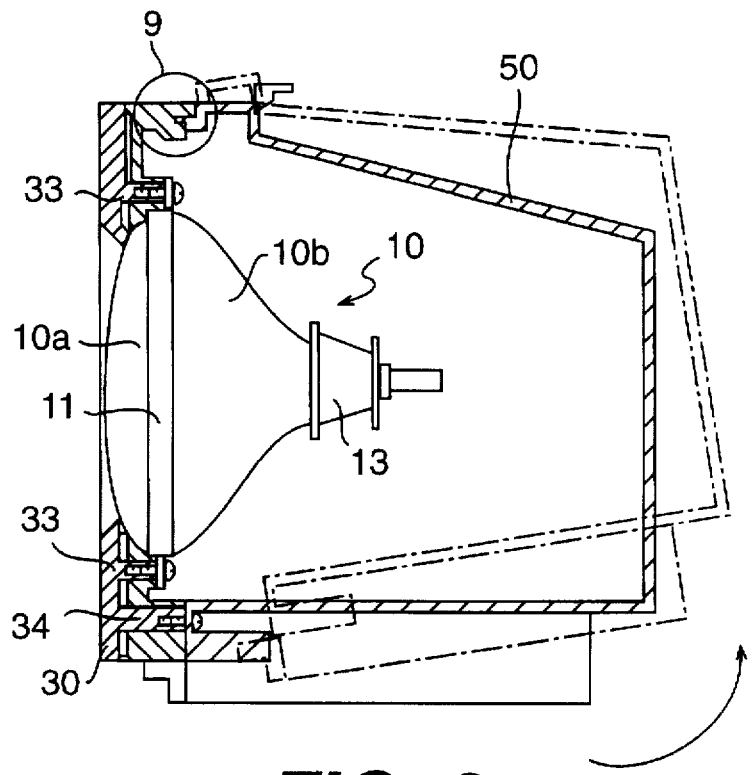
FIG. 8 is a cross-sectional view of the monitor case assembly of FIG. 7, shown assembled.
Figure 9:
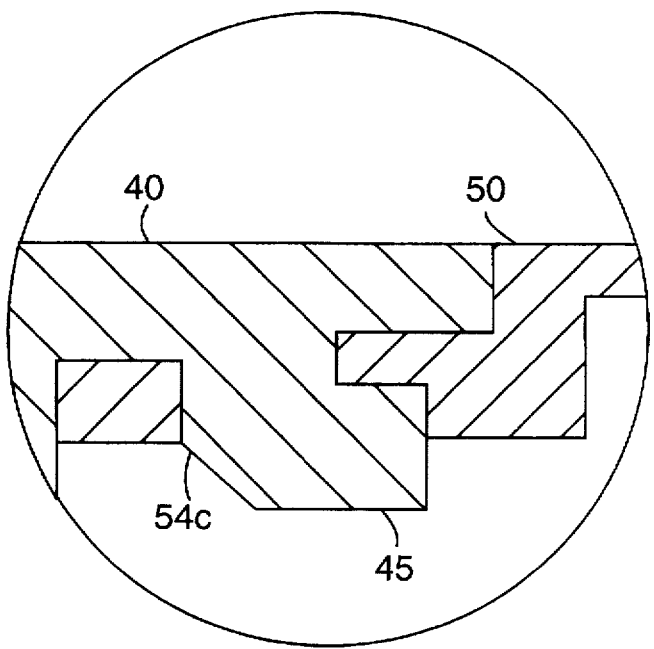
FIG. 9 is an enlarged view of the portion shown in area 9 of FIG. 8.

FIGS. 7, 8 and 9 illustrate a second preferred embodiment of the present invention wherein like reference numerals represent like elements.

Referring to FIG. 7, similar to the first preferred embodiment, the rectangular intermediate frame 40 is attached to front section 30 to which CRT 10 is fixed by four fastening screws 14 through lugs 12 of band 11. At each of the four corners of intermediate frame 40, a first boss 43 having an insertion hole 43a is integrally formed to the rear side of intermediate frame 40. First fastening elements 33 of front section 30 are configured to be inserted into insertion holes 43a. The main difference in the second preferred embodiment of the monitor ease assembly is the alternative configuration of the second assembly means. Instead of using fastening screws to connect the external monitor case sections, the present embodiment uses a combination of screws and lockingly engaged lugs and tabs. Intermediate frame 40 includes locking lugs 45 integrally provided on the underside of top surface 47 of intermediate frame 40. On the upper portion of rear section 50, two locking tabs 54c are integrally provided, and located to engage locking lugs 45 of intermediate frame 40 when assembled. Locking tabs 54c are preferably provided on the upper portion of guide protrusion 51 of rear section 50.

The assembly process of the monitor case constructed as above is similar to that of the first embodiment, and will be explained below with reference to FIGS. 8 and 9.

First fastening elements 33 are inserted into insertion holes 43a of first bosses 43 of intermediate frame 40 so that the intermediate frame is completely fitted onto front section 30. Thereafter, CRT 10 is fixed by inserting first fastening elements 33 of front section 30 into first bosses 43 and then aligning respective lugs 12 of band 11 and fastening screws 14.

As shown in FIG. 8, the upper portion of rear section 50 is tilted, as illustrated in phantom lines, to engage locking tabs 54c of rear section onto locking lugs 45 of intermediate frame 40. Then, rear section 50 is lowered so that insertion holes 52 of rear section 50 are lined up with second fastening elements 34 of front section 30. Screws 53 are inserted into insertion holes 52 and tightened. By doing so, rear section 50 is coupled with front section 30 and intermediate frame 40.

As described above, with the alternative second assembly means, the rear section is easily coupled or detached from the intermediate frame which remains attached to the front section. The tilt-to-engage locking lugs 45 and tabs 54c simplify the assembly process by reducing the number of components and thereby lowering production costs.

Further, the front and rear sections are preferably made in the same color, and the intermediate frame can be made in a different color or texture to make the exterior of the monitor attractive. Interchangeable intermediate frame of various colors and/or textures may be available and the desired color and/or texture used.

In the present invention, the intermediate frame functions to more evenly distribute the weight of a CRT and re-enforce the front section to prevent distortion and sagging of the monitor case. No gaps are created between the respective sections of the case due to the stronger structure.

The color and/or texture of the intermediate frame may be different from the front and rear sections as illustrated in FIG. 10, making the design of monitor more attractive. This increases the commercial value of the monitor.

The above description is that of the preferred embodiments of the invention. Various alterations and changes can be made without departing from the spirit and broader aspects of the invention as set forth in the appended claims.

We claim:

1. A monitor case for housing and supporting a cathode ray tube, said monitor case comprising:
    a front case section having a plurality of first fastening elements, each said first fastening element disposed at a corner of said front case section and a plurality of second fastening elements, each said second fastening element disposed adjacent to one of said first fastening elements;
    a rear case section having a plurality of assembly holes, each said assembly hole disposed at a corner of said rear case section and located to be in correspondence with a corresponding one of said second fastening elements of said front case section to thereby align and assemble said rear case section to said front case; and
    a rigid intermediate reinforcing frame for supporting a portion of the weight of said cathode ray tube, said intermediate frame having a plurality of first bosses, each said first boss disposed at a corner of said intermediate frame and located to be in correspondence with one of said first fastening elements, and a plurality of second bosses, each said second boss disposed adjacent to one of said first bosses and located to be in correspondence with one of said second fastening elements, said intermediate frame being of a color different from that of said front and rear case sections and being interposed between said front and rear sections so that said first fastening elements of said front section are received in said first bosses of said intermediate frame and said second fastening elements of said front section are received in said second bosses of said intermediate frame to thereby affix said front section to said intermediate frame to reinforce said case to prevent distortion of said case due to the weight of the cathode ray tube, and to enhance the visual appearance of said monitor case.

2. The monitor case as claimed in claim 1, wherein said intermediate frame comprises:
    a boss having an insertion hole adapted to receive a fastening element of said front section.

3. The monitor case as claimed in claim 1, wherein said rear section is fastened to said front section by a screw which also extends through a protrusion on said intermediate frame interposed therebetween.

4. The monitor case as claimed in claim 1, wherein said intermediate frame is interchangeable during assembly.

5. A monitor case comprising a front case section to which a cathode ray tube is fixed, and a rear case section fastened to the front case section, said monitor case comprising:
    a plurality of first fastening elements, each said first fastening element disposed at a corner of said front case section, and a plurality of cylindrical second fastening elements, each said second fastening element disposed adjacent one of said first fastening elements on said front case section;
    a rigid intermediate reinforcing frame having a plurality of first bosses positioned to receive a corresponding one of said first fastening elements of said front case section, and a plurality of second bosses positioned to receive a corresponding one of said second fastening elements of said front case section; and
    wherein a plurality of first threaded fasteners extend through lugs of the cathode ray tube and lock into said first fastening elements and a plurality of second threaded fasteners extend through said assembly holes of said rear case section and lock into said second fastening elements.

6. The monitor case as claimed in claim 5, wherein said front and rear sections are one color, and said intermediate frame is another color.

7. The monitor case as claimed in claim 1, wherein said intermediate frame comprises a fixing hole formed therein to engagingly receive a fixing protrusion of said front case section.

8. The monitor case as claimed in claim 1, wherein said intermediate frame comprises a slot formed therein to engagingly receive a tab of said front case section.

9. The monitor case as claimed in claim 1, wherein said intermediate frame comprises a guide groove formed thereon to press fittingly receive a guide protrusion of said rear case section.

10. The monitor case as claimed in claim 5, wherein said engageable locking lugs couple the upper portions of said rear case section and said intermediate frame, and said threaded fasteners couple the lower portions of said rear case section and said intermediate frame.

11. A monitor case assembly for housing and supporting a cathode ray tube having a peripheral band extending around its substantially rectangular screen, the band including a lug along the periphery of the screen, said monitor case assembly comprising:
    a front section having a screen opening through which the screen is visible and providing a front covering for said monitor case;
    a rear section adapted to house the cathode ray tube;
    a rigid intermediate reinforcing frame interposed between said front section and said rear section for supporting a portion of the weight of said cathode ray tube;
    a first assembly means for fixedly assembling said front section to said intermediate frame and the cathode ray tube, said first assembly means comprising a first fastening element formed in a corner area of said front section and a first boss formed in a corner area of said intermediate frame which is adapted to align with and receive therein said first fastening element, said first fastening element and said first boss disposed to align with the lug of the band, and a first threaded fastener to extend through the lug and into said first fastening element; and a second assembly means for assembling said front section, said intermediate frame, the cathode ray tube and said rear section to one another, said second assembly means comprising a second fastening element formed adjacent said first fastening element in said front section, a second boss formed adjacent said first boss in said intermediate frame, an assembly hole formed in said rear section such that said second assembly means is disposed to align with said second boss and said assembly hole, and a second threaded fastener to extend through said assembly hole and into said second fastening element.

12. The monitor case assembly of claim 11, wherein said first assembly means comprises a plurality of first fastening protrusions disposed on said front section and a plurality of first bosses correspondingly disposed on said intermediate frame so as to receive corresponding ones of said first fastening protrusions thereby firmly coupling said front section to said intermediate frame.

13. The monitor case assembly of claim 12, wherein at least one of said first protrusions and said first bosses are arranged to align with the lug of the peripheral band for attachment thereto to couple said front section and said intermediate frame to each other and the cathode ray tube.

14. The monitor case assembly of claim 11, wherein said second assembly means comprises a plurality of second fastening protrusions disposed on said front section and a plurality of second bosses correspondingly disposed on said intermediate frame so as to receive corresponding ones of said second fastening protrusions thereby firmly coupling said front section to said intermediate frame.

15. The monitor case assembly of claim 14, wherein said second assembly means further comprises a plurality of assembly holes formed in said rear section, at least one of said holes arranged to correspond with one of said second fastening protrusions and said second bosses to thereby couple said front section, said intermediate frame and said rear section to each other.

16. The monitor case assembly of claim 15, wherein said second assembly means further comprises a locking lug integrally formed on said intermediate frame and a locking tab integrally formed on said rear section so as to engage said locking lug to couple said intermediate frame to said rear section.

17. The monitor case assembly of claim 11, wherein said intermediate frame is of a different color than said front section.

18. The monitor case assembly of claim 11, wherein said intermediate frame has an external surface texture that is different from an external surface texture of said front section.

* * * * *